Jan. 16, 1968  I. FREUND ET AL  3,364,433
MOLECULAR SWARM LIQUID CRYSTAL OPTICAL PARAMETRIC DEVICES
Filed March 10, 1967

INVENTORS I. FREUND
P. M. RENTZEPIS
BY
David P. Kelley
ATTORNEY

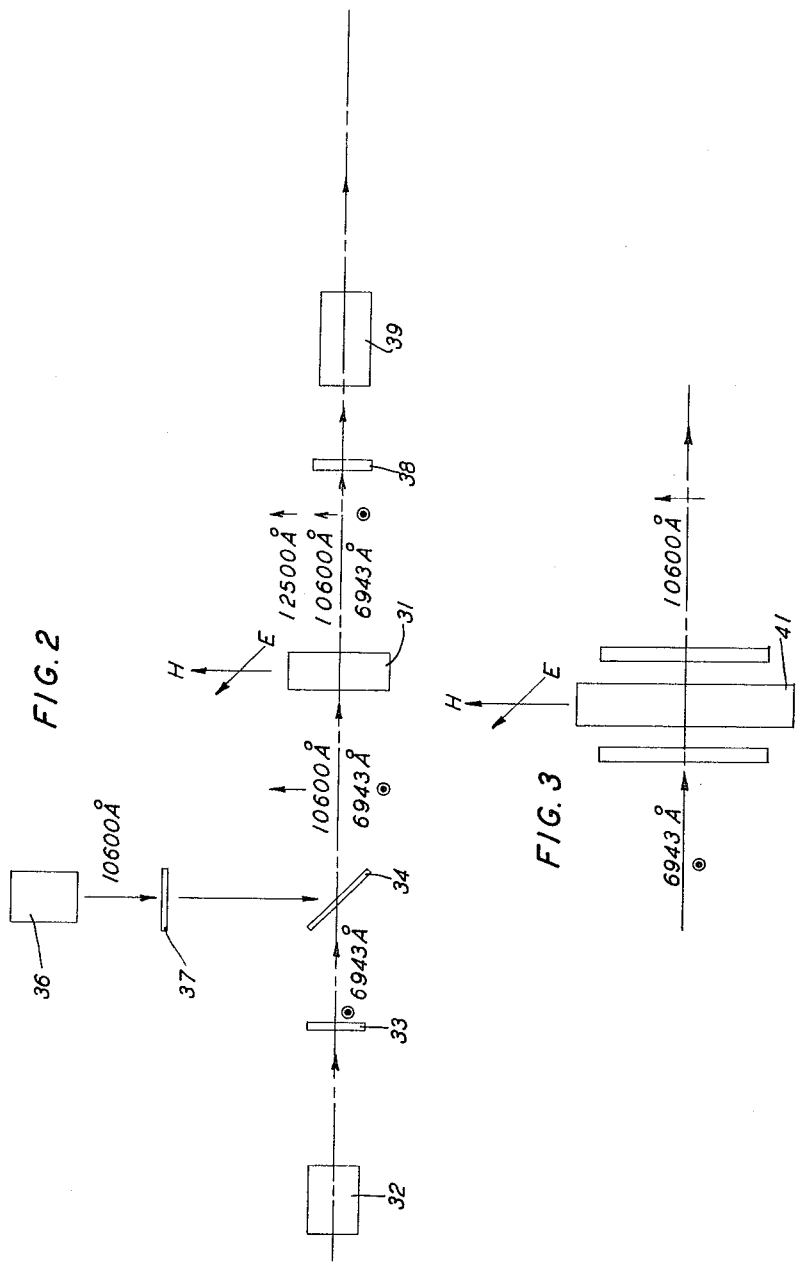

United States Patent Office 3,364,433
Patented Jan. 16, 1968

3,364,433
MOLECULAR SWARM LIQUID CRYSTAL OPTICAL PARAMETRIC DEVICES
Isaac Freund, Elizabeth, and Peter M. Rentzepis, Millington, N.J., assignors to Bell Telephone Laboratories, Incorporated, Berkeley Heights, N.J., a corporation of New York
Filed Mar. 10, 1967, Ser. No. 622,199
9 Claims. (Cl. 330—4.6)

ABSTRACT OF THE DISCLOSURE

Liquid crystals of the type characterized by molecular swarms, e.g., nematic crystals, can be made to produce second harmonics and parametric operation at optical frequencies. When magnetic and electric fields are applied to the crystal, a variable birefringence results, permitting phase matching over a range of frequencies.

Background of the invention

This invention relates to the generation of electromagnetic waves, particularly those in the optical frequency range.

The harmonic generation of coherent light utilizing nonlinear crystals is known. For example, the generation of ultraviolet light in a crystal of potassium dihydrogen phosphate (KDP) from applied red light is described in United States Patent 3,234,475 of J. A. Giordmaine. Such an arrangement depends upon the birefringence of the crystal which can be varied only over a small range. In addition, a limitation is placed on the power of the incident light beam, inasmuch as too high a power produces permanent crystal damage in the form of cavitation or rupture. Inasmuch as efficiency of conversion depends on the input power, a limitation is therefore placed on the efficiency obtainable.

Summary of the invention

The present invention generates optical frequencies in a manner somewhat similar to that shown in the aforementioned Giordmaine patent but is not subject to some of the aforementioned limitations inherent in solid crystals.

The invention is based upon the realization that certain liquid crystals, particularly those of the nematic class can be made to exhibit a large variable birefringence upon the application of a magnetic field, with or without an applied electric field. This arises from the molecular arrangement in the nematic liquid crystal. The molecules exist in swarms having a high degree of orientational order and a direction of very large magnetic susceptibility. Inasmuch as the molecules are not fixed in position, as in a solid crystal, they easily align themselves with an applied magnetic field, thereby producing a large birefringence characteristic. In addition, the electric moments of the molecules cause them to line up with an applied electric field, thereby making the crystal noncentrosymmetric, that is, all molecules are polarized in substantially the same direction, also contributing to the birefringence.

Such characteristics make it possible to generate efficiently the second harmonic of an incident laser beam, since the second harmonic and the fundamental can be made phase matchable. In addition, parametric amplification and oscillation are realizable, as are both frequency and amplitude modulation.

The invention will be more readily understood from the following detailed description and drawings.

Brief description of the drawing

FIG. 2 is a diagram of a parametric amplifier arrangement utilizing the principles of the present invention; and FIG. 3 is a diagram of a portion of an arrangement for producing parametric oscillations.

Description of illustrative embodiments

Figure 1:
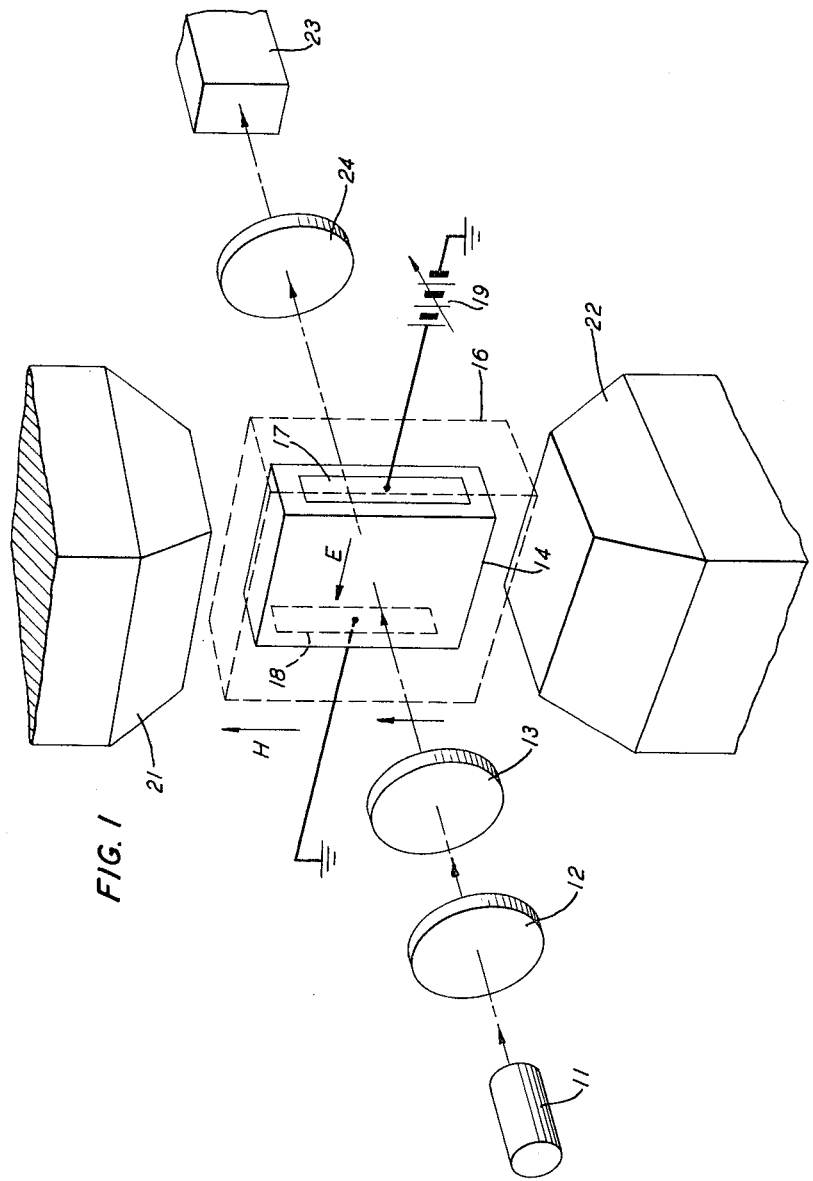
FIG. 1 is a perspective view of an embodiment of the invention for generating second harmonics.

In FIG. 1 there is shown an embodiment of the invention for generating second harmonics from an incident beam. The arrangement of FIG. 1 comprises an electromagnetic wave source 11 which may be, for example, a ruby laser producing a 6943 A. wavelength beam. The output of source 11 which, in the case of the ruby laser is a beam of coherent light, is directed through a filter 12 which is designed to pass light of 6943 A. wavelength and to block extraneous light.

From filter 12 the beam passes through a polarizer 13 which imparts a single polarization to the light, shown in FIG. 1 as a vertical polarization. The beam is then directed into a liquid crystal assembly 14 which comprises a container of fused quartz or other suitable material filled with a liquid crystal of the nematic class, such as, for example, p-azoxyanisole or p-azoxyphenetole, or other nematic liquid crystals with suitable properties. The temperature at which the liquid crystal phase occurs varies with the material used. In general, although by no means always, the temperature of the liquid crystal phase is higher than room temperature. To maintain assembly 14 at the proper temperature, an oven 16, which may take any of a number of forms, is provided. Oven 16, shown in dashed outline in FIG. 1 should be such that the light beam may enter and exit therefrom substantially unattenuated.

On either side of assembly 14 are contacts 17 and 18 for applying an electric field to the liquid crystal by means of a suitable source 19. Magnetic field producing means, the poles 21 and 22 of which are shown, produces a magnetic field in which member 14 is immersed. Preferably the magnetic field and the direction of travel of the beam are at right angles to each other. In liquid crystals having an electric moment of the molecules perpendicular to the direction of large magnetic susceptibility, the applied electric field E is normal to the magnetic field and beam direction. It is parallel to the magnetic field in those materials where the electric moment is parallel to the direction of large magnetic susceptibility.

When a light beam, such as in FIG. 1, passes through a liquid crystal, numerous frequencies are generated which are harmonics of the incident beam. In the case of the higher harmonics, they are generally too weak to be of use. The second harmonic, on the other hand, is usually much stronger than the higher harmonics. However, because of the random disposition of the swarms in the liquid crystal, there is a cancellation of the generative effects in the crystal with the net result that even the second harmonic is too weak to utilize.

In a nematic crystal, the molecular swarms tend to align themselves with a magnetic field, thereby imparting to the crystal a birefringent characteristic which in turn makes it possible to phase match the incident wave and the generated second and even higher harmonics. When this occurs, the two waves interact over a large distance, thereby increasing the amplitude of, for example, the second harmonic to usuable levels. In addition, the electric moments of the molecules tend to align themselves in an applied electric field, thereby imparting the same polarization to all generative contributions to the second harmonic. This electric field insures noncentrosymmetry in the liquid crystal and also contributes to the birefringence of the liquid crystal.

In the arrangement of FIG. 1, the magnetic field is varied until the second harmonic output of the liquid crystal is a maximum, at which point optimum phase matching is achieved. In the case of a 6943 A. input beam, a magnetic field of an order of magnitude of 1000 to 5000 gauss produces a maximum intensity of second harmonic radiation at 3472 A. wavelength. One of principal advantages of the use of the liquid crystal is its tunability. For input beams of different frequencies, the magnetic field is adjusted to produce the particular degree of birefringence necessary to give optimum phase matching. The differential index of refraction is variable over a range of, for example, zero to 0.3, which makes possible a wide range of frequencies of operation.

Nematic crystals are not optically active and are not doubly refracting, and are optically uniaxial in a magnetic field. As a consequence, a polarized beam entering the liquid crystal normal to the surface and polarized parallel or perpendicular to the magnetic field emerges from the liquid crystal with the same polarization and in the same direction. In addition, the generated second harmonic travels colinearly with the fundamental in the liquid crystal and emerges traveling in the same direction, but orthogonally polarized thereto. In the arrangement of FIG. 1, therefore, the output of the element 14 is a beam containing vertically polarized energy at 6943 A. and horizontally polarized energy at 3472 A. Where it is desired to use only the 3472 A. wave, a filter 24 may be used to filter out the 6943 A. wave. The beam then passes to a utilization device 23, which may take any one of a number of forms well known in the art, depending upon the particular use to which the beam is to be put.

From the foregoing it can readily be seen that an amplitude modulated second harmonic can be produced by varying the magnetic field H in accordane with modulating signals. This has the effect of varying the phase match and hence the amplitude of the second harmonic output. In like manner, variation of the electric field in accordane with modulating signals varies the output amplitude of the second harmonic.

The foregoing discussion has dealt with second harmonic generation in a liquid crystal. The unique characteristics of the nematic class of liquid crystals makes it possible to produce parametric amplification and oscillation also. In FIG 2 there is shown an arrangement for parametrically amplifying signals.

The arrangement of FIG. 2 comprises a crystal assembly 31 comprising a container of fused quartz or other material filled with the liquid crystal material. For simplicity, the magnetic and electric field producing means have not been shown but the fields produced thereby are indicated by the vectors E and H, E being horizontal and H vertical. These means may, of course, take the forms shown in FIG. 1, or other suitable forms. In addition, the oven for maintaining the liquid at the proper temperature has, for simplicity, been omitted.

A source of pump energy 32, which as in the case of FIG. 1 may be a ruby laser, directs a beam of energy at, for example, 6943 A., through a polarizer 33 which imparts a horizontal polarization to the beam, and into a beam combiner 34, which may take any one of a number of forms known in the art. In like manner, a source 36 of signals to be amplified directs a beam at, for example, 10600 A. through a polarizer 37, producing a vertical polarization, and to beam combining means 34. The output of combiner 34 is a beam containing horizontally polarized energy at 6943 A. and vertically polarized energy at 10600 A. This beam is directed into crystal assembly 31, as shown.

As in the arrangement of FIG. 1, the magnetic field H and electric field E produce both birefringence and noncentrosymmetry in the liquid crystal. As a consequence, the magnetic field may be varied until a phase match is achieved among the pump, signal and the idler generated within the liquid crystal. Optimum phase match is indicated by the maximum intensity output of the 10600 A. energy.

The polarizations of the pump, signal, and idler depend upon the frequencies of these waves. For the frequencies or wavelengths shown, the pump is polarized in the direction of smaller index of refraction in the liquid crystal to counteract the larger index due to the higher frequency of the pump. By the same token, the signal is polarized in the direction of high index to counteract the normally smaller index due to the signal frequency being less than the pump frequency. As a consequence, it is possible to phase match the signal and pump. The magnetic field is adjusted to produce that birefringence for which the pump, signal, and idler satisfy the parametric requirements as to frequency and phase velocity. It should be understood that the polarizations of the various waves may differ from those shown for different frequency combinations or for different liquid crystals. Determination of the proper polarizations in accordance with the above principles is within the ordinary skill in the art.

The output of member 31 is a beam containing pump signal, and idler frequencies. For the example shown, the idler is at approximately 12500 A., and the sum of it and the signal frequency equals the pump frequency. This beam is directed into a member 38 which, where only one of the frequencies, e.g., the amplified signal, is desired, may be a filter passing only that frequency. On the other hand, where more than one frequency is to be utilized, it may be a beam splitter of suitable form, or a combination of beam splitters, with or without filters. Alternatively, where the multifrequency beam is to be used, member 38 may be omitted altogether.

From member 38 the beam passes to a suitable utilization device 39 which may, of course, take any of a number of forms.

Parametric oscillation may readily be achieved utilizing the principles of the present invention in a manner similar to which the amplification was achieved in FIG. 2.

In FIG. 3 there is shown the crystal arrangement for achieving parametric oscillation. For simplicity, the pump source, magnetic and electric field producing means, oven, and utilization device, as well as various polarizers and filters have not been shown. The arrangement of FIG. 3 comprises a crystal assembly 41 comprising a suitable container filled with the liquid crystal material. Member 41 is inserted within a resonator formed by a pair of partially transmission mirrors 42 and 43, which may be separated from member 41, or attached thereto. The resonator is designed to be resonant at the frequency to be generated, e.g., 10600 A. wavelength, or for tunable operation may be broadband. Pump energy from a suitable source having, for example, a wavelength of 6943 A. and being horizontally polarized, is directed into the liquid crystal member 41. As is well known, such energy generates within the crystal a large number of frequencies. However, for a set amount of birefringence, two particular frequencies, i.e., signal and idler, will be phase matched to the pump, and hence will grow in amplitude. Varying the electric and magnetic fields, as in the case of the arrangement of FIG. 2, varies the birefringence and hence the particular signal and idler waves that are phase matched to the pump. The resonator causes the generated signal wave to make several or many passes through the crystal, in a manner well known in the art.

When the mirrors and resonator are made broadband, i.e., capable of supporting a range of frequencies, the output of the resonator can be frequency modulated by varying the magnetic or electric field in accordance with a modulating signal.

The output of the crystal and resonator, the generated signal, can be utilized in any suitable utilization device, not shown.

The foregoing discussion has dealt primarily with crystals of the nematic class. Other classes of nonoptically active crystals may also be used to generate second harmonics. For example, second harmonic generation has been observed in liquid crystals of the smectic class which, like nematic crystals, are characterized by molecular swarms. The individual swarms or domains in smectic crystals are so large that each domain functions as a second harmonic generator, and the intensities of the incremental second harmonics add to produce a strong second harmonic output. Even when the various swarms are randomly polarized, the second harmonic grows with length, giving, in effect, a noncentrosymmetric crystal.

Numerous arrangements utilizing the principles of the present invention may occur to workers in the art without departure from the spirit and scope of the invention.

What is claimed is:

1. In combination, a member containing a liquid crystal of a class characterized by having its molecules bunched in molecular swarms, means for directing a beam of electromagnetic wave energy into said liquid crystal, said beam giving rise within said liquid crystal to electromagnetic wave energy of higher frequency having a direction of propagation substantially colinear with said beam and substantially phase matched therewith, and means for utilizing the electromagnetic wave output of said crystal.

2. The combination as claimed in claim 1 wherein said liquid crystal is of the nematic class.

3. The combination as claimed in claim 1 wherein said liquid crystal is of the smectic class.

4. In combination, a liquid crystal member, said liquid crystal being characterized by having molecular swarms having a direction of high magnetic susceptibility, means for directing coherent electromagnetic wave energy into said liquid crystal, said energy giving rise within said crystal to electromagnetic wave energy of higher frequency having a direction of propagation substantially colinear with the direction of the incident energy, and means for producing a phase match within said crystal between the incident energy and energy of a particular frequency within said crystal, said means comprising magnetic field producing means.

5. The combination as claimed in claim 4, and further including means for applying an electric field to said crystal.

6. A parametric amplifier comprising a member of liquid crystal material characterized by having molecular swarms having a direction of high magnetic susceptibility, means for directing a beam of electromagnetic wave energy into said liquid crystal, said beam containing pump frequency energy and signal frequency energy, and means for producing within the crystal a phase match between the pump and signal energy, said means comprising magnetic means for varying the birefringence of said crystal.

7. A parametric amplifier as claimed in claim 5 and further including means for applying an electric field to said crystal.

8. A parametric oscillator comprising means forming a cavity resonator, a member of liquid crystal material characterized by having molecular swarms having a direction of high magnetic susceptibility within said cavity resonator, means for directing a beam of coherent electromagnetic wave energy into said liquid crystal, said beam giving rise to energy at a plurality of frequencies within said liquid crystal and means for producing a phase match between said beam and energy at one of the frequencies in the liquid crystal comprising magnetic means for varying the birefringence of said crystal.

9. A parametric oscillator as claimed in claim 8 and further including means for applying an electric field to said liquid crystal.

No references cited.

ROY LAKE, *Primary Examiner.*

D. R. HOSTETTER, *Examiner.*